July 4, 1950  H. D. STEVENS ET AL  2,514,215
TIRE BUILDING DRUM

Filed Feb. 26, 1947  4 Sheets-Sheet 1

INVENTORS
HORACE D. STEVENS
AND
RAYMOND W. ALLEN
BY
ATTORNEYS

INVENTORS
HORACE D. STEVENS
AND
BY RAYMOND W. ALLEN
ATTORNEYS

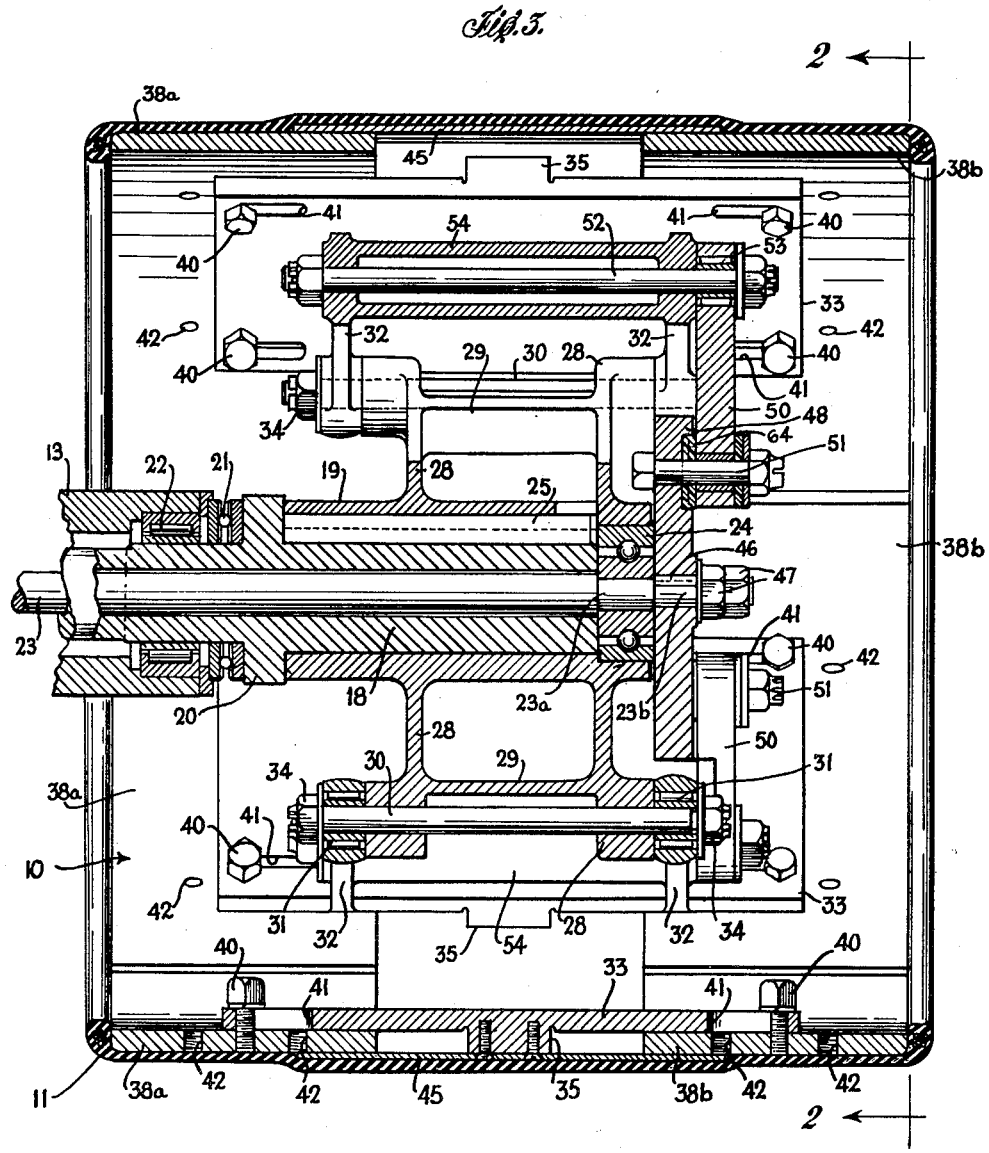

July 4, 1950 H. D. STEVENS ET AL 2,514,215
TIRE BUILDING DRUM

Filed Feb. 26, 1947 4 Sheets-Sheet 4

INVENTORS
HORACE D. STEVENS
AND
RAYMOND W. ALLEN

BY Clyr Frye
ATTORNEYS

Patented July 4, 1950

2,514,215

UNITED STATES PATENT OFFICE 2,514,215

TIRE BUILDING DRUM

Horace D. Stevens and Raymond W. Allen, Akron, Ohio, assignors to The Firestone Tire & Rubber Company, Akron, Ohio, a corporation of Ohio Application February 26, 1947, Serial No. 730,996

7 Claims. (Cl. 154—9)

This invention relates to tire building forms or drums such as commonly are employed in the manufacture of pneumatic tire casings, and more especially it relates to improved collapsible tire building drums.

The problem of providing superior collapsible building drums has long been present in the tire manufacturing industry, and many expedients have been proposed as the solution thereof. Some collapsible tire building drums comprise key sections and intermediate sections, the latter being collapsible after the key sections have been collapsed. Such drums require the use of a large number of elements of different sizes and shapes, thus making for increased weight and cost. Furthermore the groups of sections require to be collapsed and expanded in succession, thereby consuming time. Many types of collapsible drums collapse to non-circular form, that is, to somewhat elliptical shape. In such drums the long axis of the collapsed drum is greater than the inside diameter of the tire beads of a tire built thereon, with the result that the finished tire must be deformed out of round to remove it from the drum, and the inside bead core of the succeeding tire to be built upon the drum must be deformed to pass it over the drum so that it may be mounted upon the inner bead ring. It is to the avoiding of the foregoing and other disadvantages of prior art constructions that the present invention primarily is directed.

The chief objects of the invention are to provide a collapsible tire building drum that is light in weight; and which assumes a substantially circular shape when collapsed. Another object is to provide a drum of the character mentioned whereof the several collapsible sections are of identical size and shape. Other objects will be manifest as the description proceeds.

Of the accompanying drawings:

Fig. 3 is a longitudinal section of the drum substantially on the line 3—3 of Fig. 2.

Figure 1:
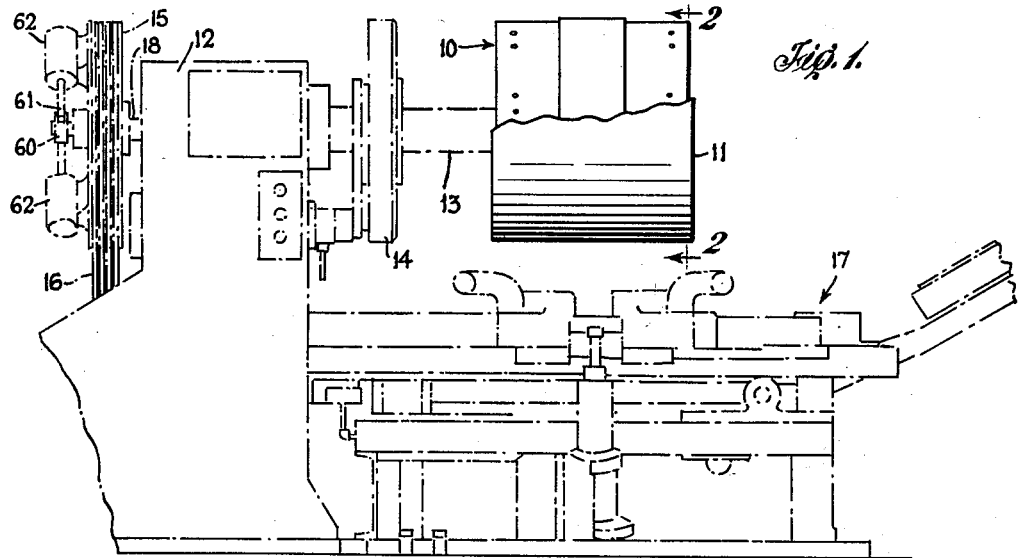
Fig. 1 is a side elevation of a collapsible tire building drum embodying the invention, and a portion of a pneumatic tire built thereon, other elements of the associated tire building machine being indicated in broken lines.

Referring to the drawings, particularly Fig. 1, thereof, there is shown a collapsible tire building drum generically designated 10, a fragmentary tire casing 11 being shown as it appears when built on said drum. The drum may be used on any conventional tire building machine such as that shown in broken lines. Said tire building machine comprises the usual housing 12 in which is located the motor (not shown) for driving the drum, there being a tubular sleeve 13 extending laterally from the housing, which sleeve encloses a driven quill or spindle 18 that supports and rotates the drum, and which is connected thereto in a manner presently to be explained. The spindle 18 is provided at its end remote from the drum with a driving pulley 15 connected by transmission belts 16 with the motor aforementioned. The inner bead-setting ring 14 of the machine is mounted on the sleeve 13 for axial movement thereon, in the usual manner. Various mechanisms for applying the constituent parts of the tire 11 to the drum 10 are indicated generally by the numeral 17. Said mechanisms are substantially similar to those employed with the tire building machine shown in U. S. Patent Number 2,381,379, issued August 7, 1945 to H. D. Stevens, one of the co-inventors herewith.

As shown in Fig. 3, the quill or spindle 18 is hollow or tubular, and is formed with an integral flange or collar 20. The drum 10 includes a hub portion 19 that is mounted upon the spindle 18 and has its rear end in abutting relation to said flange 20, the forward end portion of said hub projecting beyond the extremity of said spindle. A thrust bearing 21 is located between the rear face of the flange 20 and the outer end of sleeve 13, and a journal bearing 22 is positioned between the sleeve 13 and the spindle 18, adjacent said flange 20. The spindle 18 and hub 19 are connected to each other for concurrent rotation by means of a conventional key 25. Extending axially through the hollow quill or spindle 18 is a shaft 23 that has a region 23a of reduced diameter near its outer end, which portion is received in a bearing 24 mounted in the outer extremity of hub 19, beyond spindle 18. Beyond reduced portion 23a the shaft 23 has a further reduced portion 23b upon which a disc or wrist plate 48 is mounted, the latter having driving connection with the shaft through the agency of key 46. Lock nuts 47 on the end of shaft 23 retain the shaft 23, bearing 24, and wrist plate 48 in assembled relation.

The arrangement is such that the shaft 23 may be oscillated relatively of spindle 18 with the result that wrist plate 48 is oscillated relatively of drum-hub 19, such relative movement being utilized for effecting the collapsing and expanding of the drum 10, as subsequently will be explained. For oscillating the shaft 23 relatively of the spindle 18, any suitable manually operated or power-operated means may be employed. Solely for illustrative purposes, power-operated means for this purpose is indicated in Fig. 1, said means comprising a pinion 60 mounted upon the shaft 23 at the rear end thereof, a pair of racks 61 meshed with said pinion at opposite sides thereof, and fluid pressure operated cylinders 62 for reciprocating the respective racks, said cylinders being mounted upon the pulley 15. Charging of the outer ends of cylinders 62 will oscillate the shaft 23 the proper angular distance to effect collapse of the drum 10. The procedure is reversed to restore the drum to expanded operative condition. Although the cylinders 62 may be utilized to collapse and expand the drum while rotating, such operations preferably are effected while the drum is stationary.

Figure 2:
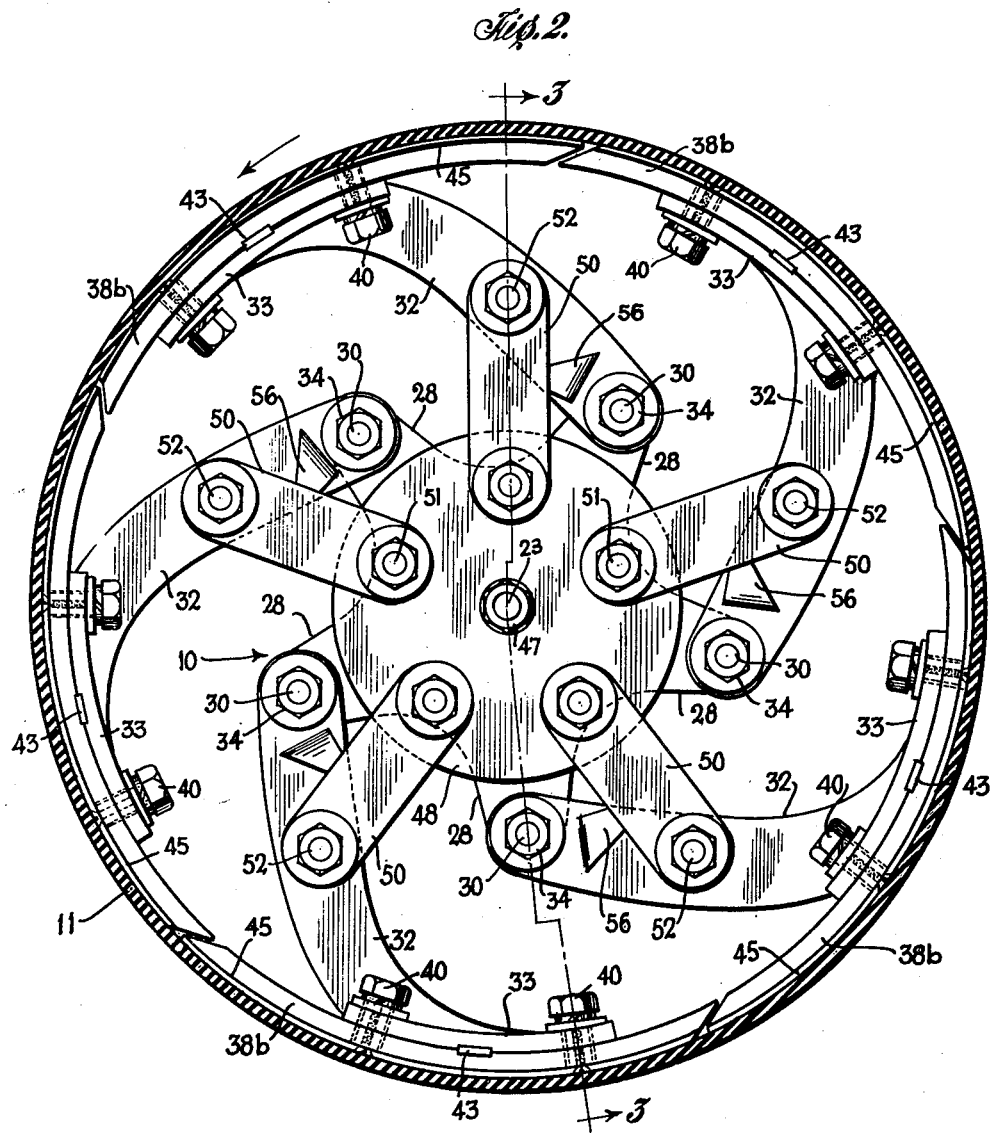
Fig. 2 is a section on the line 2—2 of Fig. 1 and Fig. 3 showing an end elevation of the tire building drum in expanded or operative position.

The hub 19 is formed with a plurality of radially extending lugs or ears 28, 28, which ears are arranged in pairs, the ears of each pair being spaced apart from each other axially of the hub and connected to each other by an integral web 29. As shown, there are five pairs of the ears 28, the same being disposed symmetrically around the hub. Supported in the outer ends of each pair of ears 28 are respective hinge pins 30, which pins preferably are non-rotative with respect to the ears, and are disposed parallel to the axis of the drum. The opposite end portions of each pin 30 extend beyond the outer lateral faces of the ears 28 that carry the pin, the projecting portions of the pin being provided with respective roller bearings 31 upon which are journaled respective, elongate, slightly arcuate arms 32 that extend non-radially from their pivots and have their free ends integrally united with a rectangular saddle-plate 33 adjacent the margin of one of the long sides thereof. The saddle-plates 33 are transversely arcuate, their axes of curvature being coincident with the axis of the drum in the expanded or operative condition of the latter, as shown in Fig. 2, the arms 32 extending from the concave sides thereof. The pivot pins 30 are retained in place by the usual washers and nuts 34 on the opposite ends thereof. Each saddle-plate 33 is formed with a medial, transversely extending rib 35, the function of which presently will be explained, said ribs 35 being disposed in the central transverse plane of the drum 10.

The perimeter of the drum comprises a plurality of drum segments, namely, a group (five) of drum segments 38a located at the inner end of the drum and a group (five) of drum segments 38b located at the outer end of the drum. All segments 38a are identical with each other and all segments 38b are identical with each other. The segments 38a differ from the segments 38b only in that the lateral marginal profiles over which the bead portions of the tire 11 are built are located on one side of the segments 38a and on the opposite side of segments 38b. In the expanded or operative condition of the drum the segments of each group 38a, 38b are disposed end to end and each define a full circle of 360 degrees. The confronting ends or margins of the drum segments are complementally beveled. The drum is designed to rotate in counter-clockwise direction as viewed in Fig. 2, and the marginal beveling on the drum segments is such that the leading edge of each segment underlies the trailing edge of the preceding segment.

There is a drum segment 38a and 38b mounted upon the convex side of each saddle-plate 33, the width of each segment being such that it projects beyond the end margin of the saddle-plate axially of the drum. Each drum segment is secured to its saddle-plate by two cap screws 40, which cap screws extend through respective slots 41 in the saddle-plate and are threaded into the segment nearer the leading than the trailing end thereof, said slots 41 being disposed parallel to the axis of the drum. The arrangement is such that the drum segments 38a, 38b may be adjusted toward or away from the central plane of the drum and thus to alter the length of a tire-band 11 built thereon. Additional threaded apertures 42 are formed in each drum segment to receive the screws 40, thereby increasing the extent of adjustment that may be obtained. A key 43 is interposed between each drum segment and its saddle-plate 33, in confronting keyways formed in each, to assure accurate registry of these members.

When the drum segments 38a, 38b are in their innermost positions of axial adjustment they abut the ribs 35 on the saddle plates 33. In other positions of axial adjustment the inner margins of the segments are in spaced relation to said rib, as shown in Fig. 3. To cover such spaces at each side of the ribs 35, and also to span the space between adjacent saddle plates 33 in the central circumferential region of the drum, so that the latter presents a circumferentially continuous periphery, bridge plates 45 are provided. Said plates are of relatively thin metal and are of the same length as the drum segments 38a, 38b. One plate 45 is provided for each saddle plate 33, said plate 45 being attached in its medial region to the rib 35 of said saddle plate. The bridge plates 45 overlie the drum segments 38a, 38b to the extent necessary to conceal the spaces between the segments and the ribs 35 in all positions of axial adjustment of said segments.

Figure 4:
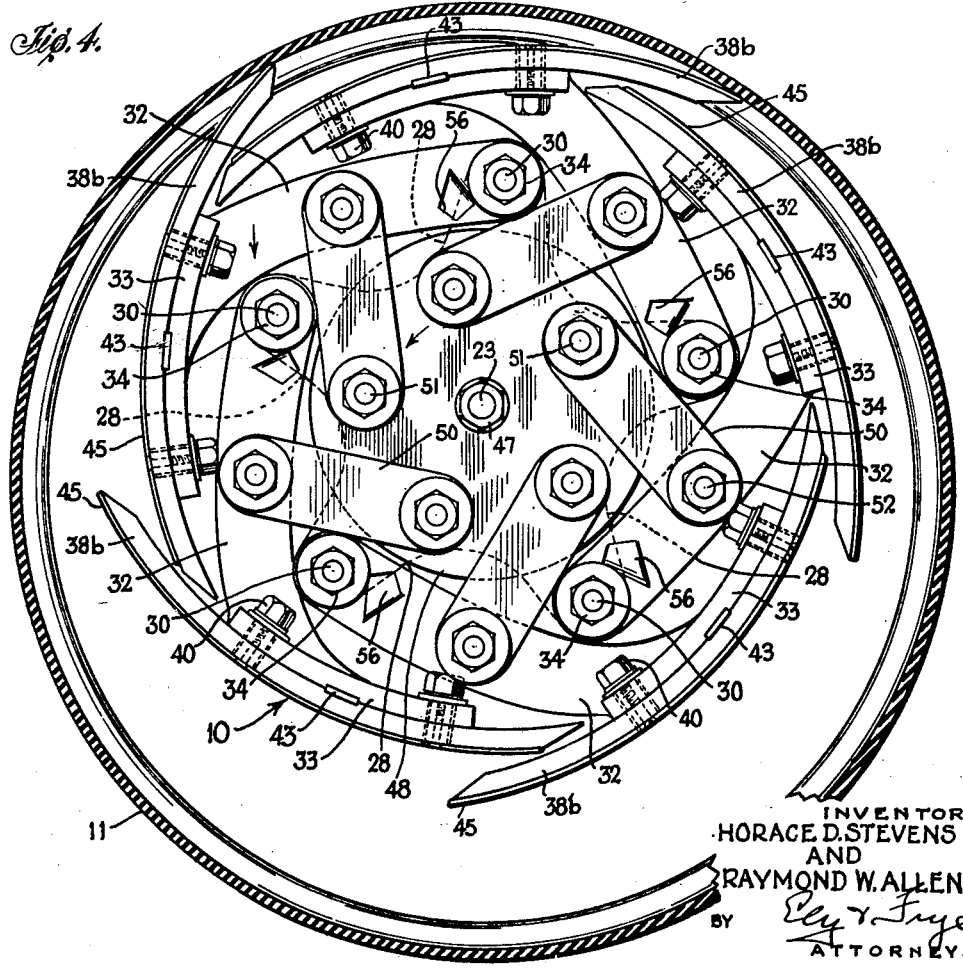
Fig. 4 is a section similar to Fig. 2 showing the position of the various elements of the drum when in collapsed or inoperative position.

In the expanded or operative condition of the drum the drum segments 38a, 38b are disposed in the position of circumferential continuity shown in Fig. 2, and define a true circle. In the collapsed or inoperative condition of the drum the said drum segments are in the positions shown in Fig. 4 wherein they are symmetrically disposed about the axis of the drum, but in overlapping relation and nearer to said axis to enable the removal of the finished tire. Because of the symmetrical arrangement of the various elements of the drum as shown in Fig. 4, the drum at all times is in rotational balance, and no strains are imposed on the machine such as would be present if the drum were rotated while in unbalanced condition.

The drum is collapsed by rotary movement of the wrist plate 48 relatively of the hub 19, which relative movement is effected by the relative movement of shaft 23 and quill or spindle 18, as previously explained. To this end links 50 are pivotally connected at one end to the wrist-plate 48 by means of bolts 51, and at their other ends are pivotally connected to respective pairs of arms 32 of the saddle plates 33 by pivot pins 52. Roller bearings 53 similar to those shown at 31 are employed between the links 50 and the pivot pins 52 to reduce friction at these points. Friction material 54, Fig. 3, is employed between the links 50 and wrist-plate 48, around the bolts 51, to provide friction at these points for a purpose presently to be explained, said bolts 51 providing means whereby the amount of friction may be adjusted. At the point where each pivot pin 52 is mounted in the respective pairs of arms 32, the latter are connected by an integral tubular tie or brace 54, Fig. 3, through which brace the pivot pin extends. The arrangement is such as to strengthen the arms 32 and assure that force applied to the links 50 will be distributed to both arms of each pair thereof. It will be seen that the wrist-plate 48 and links 50 constitute toggles that are interposed between the shaft 23 and saddle plates 33, said toggles being straightened in the expanded condition of the drum shown in Fig. 2 and flexed or bent in the collapsed condition of the drum shown in Fig. 4. In the expanded condition of the drum shown in Fig. 2, the bolts 51 are located slightly past radial alignment with the axis of the drum and the respective pivot pins 52. Such overcenter movement of the toggle hinges 51 is limited by lugs 56 formed on the outwardly presented lateral faces of the respective outermost arms 32 of each pair of arms, said lugs projecting into the paths of the respective links 50 to be abutted thereby, whereby further overcenter movement of the hinge points 51 is arrested. The overcenter arrangement described assists in preventing collapse of the expanded drum from pressure applied radially to the periphery of the drum, especially during the fabrication of a tire thereon. Collapse of the drum from the aforementioned cause additionally is opposed by the friction at the hinge bolts 51 as the result of the friction material 64 located at these points.

In the operation of the invention, the collapsing and expanding of the drum is effected by angular or oscillatory movement of the wrist-plate 48 relatively of the drum-hub 19, which relative movement is the result of similar relative movement between the shaft 23 and the quill or spindle 18, induced by the fluid pressure operated cylinders 62 as previously explained. The arrangement is such that charging of the rear or outer ends of the cylinders 62 will oscillate the wrist-plate 48 in counter-clockwise direction, as indicated by the arrow in Fig. 4, and thus effect collapse of the drum segments. When the cylinders 62 are reversely charged the wrist-plate is turned in clockwise direction to expand the drum segments to the condition shown in Fig. 2.

Since all of the drum segments concurrently move toward collapsed position, and such movement is non-radial with relation to the tire 11 on the drum initial separation of tire and drum segments occurs at the noses or leading edges of the latter, and progresses toward the trailing edges thereof with a peeling action, the arrangement being such that the mold segments are stripped from the tire with but little power consumption. The drum segments are symmetrically arranged when collapsed which arrangement is advantageous if the drum is expanded or collapsed while rotating; however, it is preferred that such expansion and collapse of the drum be effected while it is stationary. Furthermore, the symmetrical arrangement of the collapsed drum facilitates the removal of the finished tire 11 therefrom, especially if such removal is effected by mechanical means. Due to the use of many identical elements, the drum may be manufactured at relatively low cost. The drum is light in weight and achieves the other advantages set out in the foregoing statement of objects.

Figure 5:
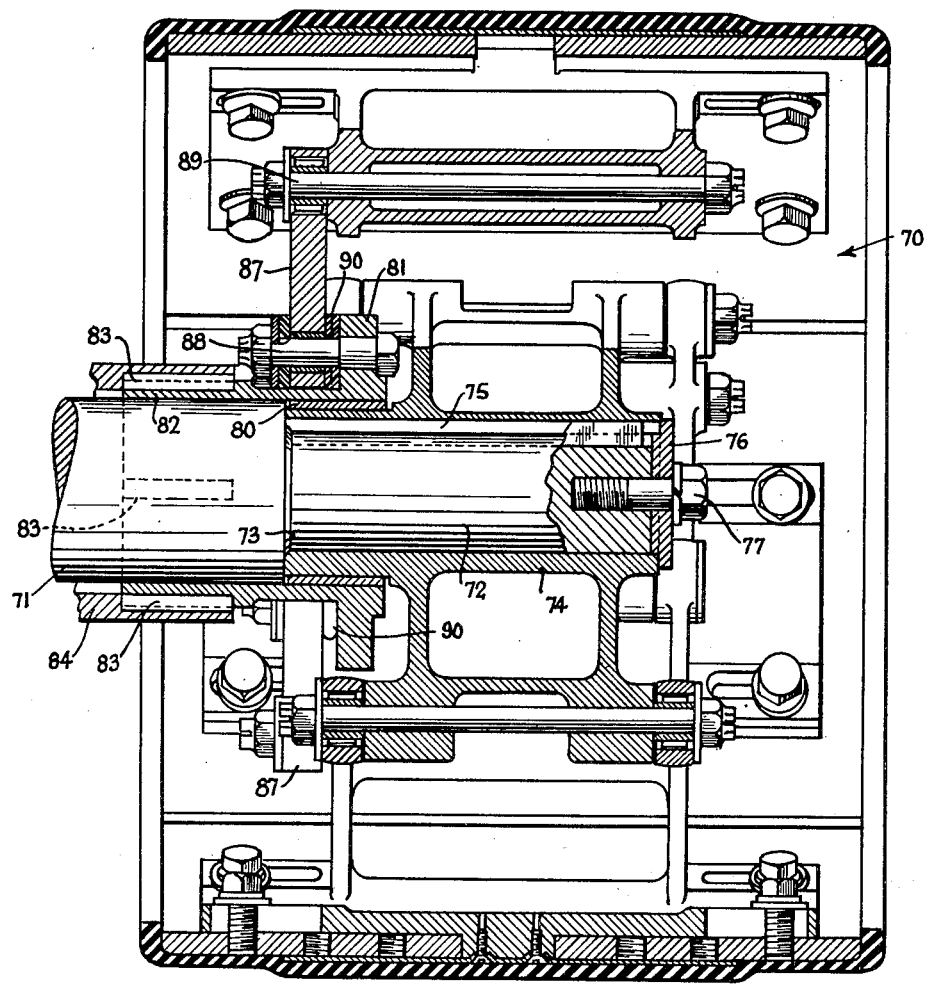
Fig. 5 is a substantially diametric section of a drum that constitutes another embodiment of the invention.

The embodiment of the invention shown in Fig. 5 is essentially similar to the embodiment previously described, and differs therefrom chiefly in the location of the wrist-plate and the mechanism for oscillating the same relatively of the drum-hub. The drum, generically designated 70, is supported and rotated by the usual power driven spindle 71, the latter having an outer end portion 72 of reduced diameter to provide a shoulder 73 on the spindle. The drum 70 comprises a hub 74 that is mounted upon the reduced portion 72 of the spindle and has driving engagement therewith through the agency of a key 75. A cap plate 76 is secured upon the outer extremity of the spindle by an axial cap screw 77, said cap extending over the adjacent end of the hub 74 to retain the latter on the spindle, the opposite end of the hub abutting the shoulder 73 of the spindle.

The end portion of hub 74 that abuts shoulder 73 is slightly reduced in diameter, and mounted upon such reduced portion of the hub is an annular bearing bushing 80 upon which a wrist-plate 81 is journalled. The latter is formed with a tubular axial extension 82 that extends rearwardly over the spindle 71, to the left of shoulder 73 as viewed in Fig. 1, the arrangement being such that the wrist-plate and its extrusion may be oscillated relatively of the spindle 71 and the hub 74. For so oscillating the wrist-plate, the extension 82 thereof has driving connection, through the agency of keys 83, with one end of a tubular sleeve 84 within which the spindle 71 is located. The extension 82 supports one end of the sleeve 84, the other end of which (not shown) is journalled on the spindle 71 in any suitable or desired manner. The arrangement is such that the sleeve 84 will rotate with the spindle 71 whenever the latter is driven, but is capable of angular or oscillatory movement relatively thereof. For so oscillating the sleeve 84, any suitable manually operable means (not shown) may be provided, which means preferably is operable when the spindle 71 is stationary to obviate sudden collapsing of the drum and strains incidental thereto.

The relative oscillatory movement of the wrist-plate 81 and hub 74 is utilized to effect collapse and subsequent expansion of the drum 70 and to this end a plurality of links 87 are pivotally connected at 89 to collapsible elements of the drum structure. Each pivotal connection 88 includes friction material 90, the latter being identical in structure and function with the friction material 64 of the previously described embodiment of the invention, and the links 87 being identical with the links 50 thereof. All other elements of the drum structure are identical with similar elements of the previously described embodiment of the invention, wherefore a more detailed description thereof is thought not to be necessary.

The modified embodiment of the invention includes all of the advantageous features of the first-described embodiment thereof.

Other modifications may be resorted to without departing from the spirit of the invention, or the scope thereof as defined by the appended claims.

What is claimed is:

1. A rotary tire building form comprising a rotatable hub, a plurality of identical arcuate segments collectively constituting a complete drum periphery, the leading end of each segment underlying the trailing end of the preceding segment, arms fixedly connected to each segment intermediate the ends thereof, said arms extending non-radially of the hub and pivotally connected to the latter, a wrist plate disposed coaxially of the hub and capable of oscillatory movement relatively thereof, and links pivotally connected to said wrist-plate and to the respective arms, intermediate the ends of the latter and at a fixed point thereof, for effecting collapse or expansion of the drum upon relative oscillation of the hub and wrist plate.

2. A combination as defined in claim 1 including stop-lugs formed on the respective pairs of arms adapted to arrest movement of the links during expansion of the drum in a position wherein the pivot points of the arms on the wrist-plate are slightly over center with relation to radial lines extending from the pivotal connections between arms and links to the axis of the drum.

3. A combination as defined in claim 1 including means creating friction between the wrist-plate and the arms that are pivotally connected thereto.

4. A collapsible tire building drum of the character described comprising a plurality of segments forming the drum periphery, a rotary spindle upon which the drum is indirectly mounted, a hub mounted on said spindle, arms extending between said hub and said segments, one end of each of said arms being pivotally attached directly to said hub and the other end of said arms being permanently bolted to said segments at points nearer the leading than the trailing ends of the latter, a rotary shaft extending axially through said spindle and being rotatable independently thereof, link attachment means mounted on and rotatable with said shaft, links pivotally connected to said means and to said arms, intermediate the ends of the latter, for effective collapse and expansion of the drum periphery upon relative movement of the hub and link attachment means.

5. A rotary tire building drum comprising a driven hollow spindle upon which the drum is mounted and by which the drum is driven, a rotatable hub mounted on and being keyed to said spindle with said hub's forward end projecting beyond the extremity of said spindle, a plurality of arcuate segments, arms mounting the segments on said hub, one end of each said arms being pivotally attached directly to said hub and the other ends thereof terminating in transversely slotted saddle plates formed integral therewith, said plates being fixedly attached to said segments by means of cap screws extending through said slots and in threaded relation with said segments and with the heads of said screws in contact with the radial inner surface of said plates, a shaft extending axially through said spindle and hub, a wrist plate mounted on and keyed to an end of said shaft, said shaft being rotatable independent of said spindle, links pivotally connected at one end to said wrist plate and at their other end pivotally connected to said arms, intermediate the ends of the latter, for effecting collapse or expansion of the drum upon relative rotational movement of the hub and wrist plate.

6. A rotary tire building drum comprising a driven hollow spindle upon which the drum is mounted and by which the drum is driven, a rotatable hub mounted on and being keyed to said spindle with said hub's forward end projecting beyond the extremity of said spindle, a plurality of arcuate segments, arms mounting the segments on said hub, one end of each said arms being pivotally attached directly to said hub and the other ends thereof terminating in transversely slotted saddle plates formed integral therewith, said plates being fixedly attached to said segments by means of cap screws extending through said slots and in threaded relation with said segments and with the heads of said screws in contact with the radial inner surface of said plates, a shaft extending axially through said spindle and hub, a wrist plate mounted on and keyed to an end of said shaft, said shaft being rotatable independent of said spindle, links pivotally connected at one end to said wrist plate and at their other end pivotally connected to said arms, intermediate the ends of the latter, for effecting collapse or expansion of the drum upon relative rotational movement of the hub and wrist plate, the center point of said connection of said link to the wrist plate being at a point slightly past radial alignment with the axis of the drum and the center of said connections to said arms.

7. A rotary tire building form comprising a hub mountable upon a rotary spindle, a plurality of arcuate segments collectively constituting a complete cylindrical drum periphery, drum mounting arms having one end of each affixed to said segments and the other end pivotally connected to the hub, said spindle having link attachment means affixed thereto normally rotating with said hub and capable of independent movement relatively to the hub, and a plurality of links each having one end pivoted to a said drum mounting arm, intermediately of the ends of the latter, the other end of each of said links being pivoted to said link attachment means, whereby said segments are concurrently drawn circumferentially and radially inwardly to effect collapse of the drum with the segments in overlapping relation as a result of such relative movement in one direction of rotation of said spindle with respect to said hub and are concurrently expanded to cylindrical drum form as a result of relative movement in the opposite direction of rotation of said spindle with respect to said hub.

HORACE D. STEVENS.
RAYMOND W. ALLEN.

REFERENCES CITED

The following references are of record in the file of this patent:

UNITED STATES PATENTS

| Number | Name | Date |
| --- | --- | --- |
| 905,305 | Gage | Dec. 1, 1908 |
| 2,201,469 | Bostwick | May 21, 1940 |

Certificate of Correction

Patent No. 2,514,215                                                    July 4, 1950

HORACE D. STEVENS ET AL.

It is hereby certified that error appears in the printed specification of the above numbered patent requiring correction as follows:

Column 7, line 11, after the word "plate" and before the period insert *, the center point of said connection to the wrist plate being at a point slightly past radial alignment with the axis of the drum and the centers of said connections to said arms*;

and that the said Letters Patent should be read as corrected above, so that the same may conform to the record of the case in the Patent Office.

Signed and sealed this 20th day of March, A. D. 1951.

[SEAL]

THOMAS F. MURPHY,
                                                   *Assistant Commissioner of Patents.*